(12) United States Patent
Syed-Ebrahim et al.

(10) Patent No.: US 10,735,385 B2
(45) Date of Patent: Aug. 4, 2020

(54) ADAPTIVE AND EFFICIENT DATABASE PROTECTION AND MIGRATION WITH DEVICE STATE CHANGES

(71) Applicant: Samsung Electronics Co., Ltd., Suwon-si, Gyeonggi-do (KR)

(72) Inventors: Abdul Syed-Ebrahim, Milpitas, CA (US); Peng Ning, Saratoga, CA (US); SJ Oh, Suwon-si (KR); Hyunchul Woo, Seongnam-si (KR); Sang-Hyup Cho, Suwon (KR); Roy Heeseung Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 118 days.

(21) Appl. No.: 14/855,078

(22) Filed: Sep. 15, 2015

(65) Prior Publication Data

US 2016/0255061 A1    Sep. 1, 2016

Related U.S. Application Data

(60) Provisional application No. 62/121,945, filed on Feb. 27, 2015.

(51) Int. Cl.
*H04L 29/06* (2006.01)
*H04W 12/06* (2009.01)

(52) U.S. Cl.
CPC ........ *H04L 63/0442* (2013.01); *H04L 63/045* (2013.01); *H04L 63/0435* (2013.01); *H04L 63/08* (2013.01); *H04W 12/06* (2013.01)

(58) Field of Classification Search
CPC .. H04L 9/00; G06F 21/00; H04N 7/00; G07F 7/00
See application file for complete search history.

(56) References Cited

U.S. PATENT DOCUMENTS

| | | | |
|---|---|---|---|
| 2005/0283620 A1* | 12/2005 | Khulusi | G06F 21/6254 713/185 |
| 2008/0033960 A1* | 2/2008 | Banks | G06F 21/6227 |
| 2009/0013194 A1* | 1/2009 | Mir | G06F 21/577 713/193 |
| 2010/0250442 A1* | 9/2010 | Coppinger | G06Q 20/20 705/75 |
| 2011/0252243 A1* | 10/2011 | Brouwer | H04L 9/0838 713/189 |

* cited by examiner

*Primary Examiner* — Joseph P Hirl
*Assistant Examiner* — Leynna Truvan (57) ABSTRACT

A method and apparatus for data security incorporating device state. The method includes encrypting sensitive data written to an electronic device while the electronic device is in a locked state using a public key of an asymmetric master key pair. The method also includes, in response to detecting that the electronic device enters an unlocked state, converting asymmetric encryption of the sensitive data into symmetric encryption of the sensitive data using a symmetric master key. Encrypting of the sensitive data may include encrypting the sensitive data using a data encryption key (DEK) and encrypting the DEK using the public key. Converting of the asymmetric encryption of the sensitive data into the symmetric encryption may include decrypting the encrypted DEK using a private key of the asymmetric master key pair and re-encrypting the DEK using the symmetric master key without decrypting and re-encrypting the sensitive data.

20 Claims, 5 Drawing Sheets

ADAPTIVE AND EFFICIENT DATABASE PROTECTION AND MIGRATION WITH DEVICE STATE CHANGES

CROSS-REFERENCE TO RELATED APPLICATION(S) AND CLAIM OF PRIORITY

The present application claims priority to U.S. Provisional Patent Application Ser. No. 62/121,945, filed Feb. 27, 2015, entitled "ADAPTIVE & EFFICIENT PROTECTION & MIGRATION OF DATABASE TO DEVICE STATE CHANGES." The content of the above-identified patent document is incorporated herein by reference.

TECHNICAL FIELD

This disclosure relates generally to data security. More specifically, this disclosure relates to adaptive and efficient database protection and migration with device state changes.

BACKGROUND

Data security is a topic of ever increasing importance and scrutiny. Users of electronic devices desire convenient and fast access to data but also want unauthorized access of the data to be prevented. Users of electronic devices may also desire to securely enter data into their device without unlocking the device and still expect that data to remain secure.

SUMMARY

Embodiments of the present disclosure provide adaptive and efficient database protection and migration with device state changes.

In an embodiment, a method for data security incorporating device state is provided. The method includes encrypting sensitive data written to an electronic device while the electronic device is in a locked state using a public key of an asymmetric master key pair. The method also includes, in response to detecting that the electronic device enters an unlocked state, converting asymmetric encryption of the sensitive data into symmetric encryption of the sensitive data using a symmetric master key.

In another embodiment, an apparatus for an electronic device for data security incorporating device state is provided. The apparatus includes a memory and at least one processor. The at least one processor configured to execute program code stored in the memory to cause the apparatus to encrypt sensitive data written to an electronic device while the electronic device is in a locked state using a public key of an asymmetric master key pair; and convert, in response to detecting that the electronic device enters an unlocked state, asymmetric encryption of the sensitive data into symmetric encryption of the sensitive data using a symmetric master key.

In another embodiment, a non-transitory computer-readable medium comprising program code is provided. The program code, when executed by at least one processor of an apparatus for an electronic device, causes the apparatus to encrypt sensitive data written to an electronic device while the electronic device is in a locked state using a public key of an asymmetric master key pair; and convert, in response to detecting that the electronic device enters an unlocked state, asymmetric encryption of the sensitive data into symmetric encryption of the sensitive data using a symmetric master key.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure recognize that electronic devices may need support for storing sensitive data in a database to meet stringent security requirements. Sensitive data is data that is only available for use when the device is in an unlocked state where the user has authenticated himself or herself by furnishing a password for the electronic device. In order to allow for sensitive data to be stored in a database, an application entering such sensitive date may requires the database to support column wise encryption. The database may also require the application to configure the sensitive columns of managed tables. Applications gain higher security, also benefit from seamless co-existence of sensitive and non-sensitive data in the database without compromising on the original capability of the database engine.

Accordingly, embodiments of the present disclosure allow for reading from and writing to a database while the device is in a locked state. The database data in one database record may be a mixture both sensitive and non-sensitive database cells. This means that reading can partially fail (e.g., with respect to requests for sensitive data) during update and read operations in the locked state. To handle this situation, embodiments of the present disclosure provide for applications to be allowed to configure the behavior of the read operation in locked state. Additionally, embodiments of the present disclosure provide for the database engine to update the database record in locked state by adapting to the failure in the reading of sensitive data and treating the sensitive data as empty blob so that update operation can still go through as long as sensitive is not used for a decision making purpose.

Embodiments of the present disclosure allow the insert/update of sensitive database data in locked state and unlocked state using asymmetric (i.e., the public key of the asymmetric key pair) and symmetric master keys. Embodiments of the present disclosure further recognize and take into account that data protected using the asymmetric public key may be costly to read in terms the decryption process time and resource consumption leading. Accordingly, embodiments of the present disclosure provide for conversion of the asymmetrically protected records into symmetrically protected records. This allows for applications using the protected records to further benefit from these security features due to the seamless performance benefit associated with the reading of the sensitive data irrespective of whether the sensitive data was added or updated during locked state or unlocked state.

Figure 1:
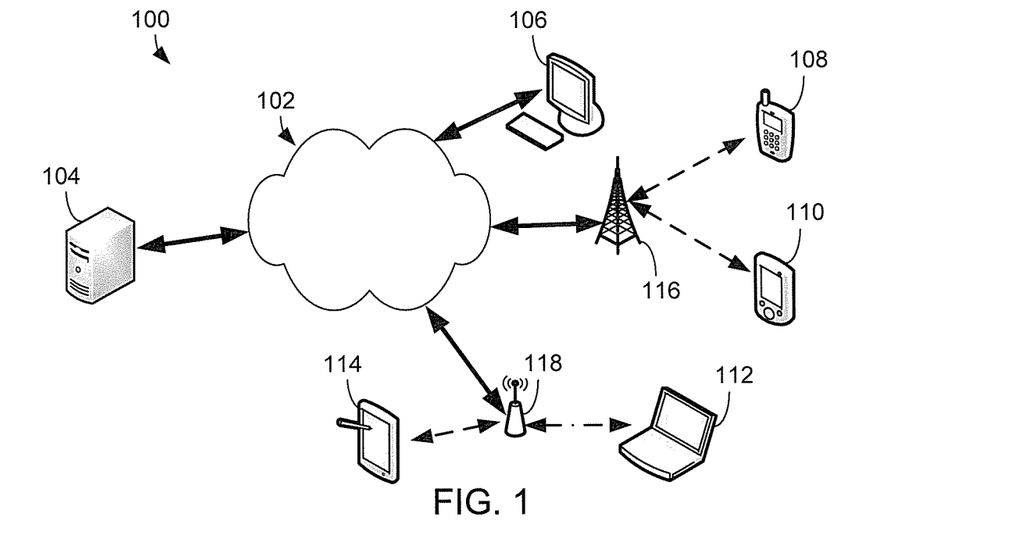
FIG. 1 illustrates an example communication system in which various embodiments of the present disclosure may be implemented.

FIG. 1 illustrates an example communication system 100 in which various embodiments of the present disclosure may be implemented. The embodiment of the communication system 100 shown in FIG. 1 is for illustration only. Other embodiments of the communication system 100 could be used without departing from the scope of this disclosure.

As shown in FIG. 1, the system 100 includes a network 102, which facilitates communication between various components in the system 100. For example, the network 102 may communicate Internet Protocol (IP) packets, frame relay frames, or other information between network addresses. The network 102 may also be a heterogeneous network including broadcasting networks, such as cable and satellite communication links. The network 102 may include one or more local area networks (LANs); metropolitan area networks (MANS); wide area networks (WANs); all or a portion of a global network, such as the Internet; or any other communication system or systems at one or more locations.

The network 102 facilitates communications between at least one server 104 and various client devices 106-114. Each server 104 includes any suitable computing or processing device that can provide computing services for one or more client devices. Each server 104 could, for example, include one or more processing devices, one or more memories storing instructions and data, and one or more network interfaces facilitating communication over the network 102.

Each client device 106-114 represents any suitable computing or processing device that interacts with at least one server or other computing device(s) over the network 102. In this example, the client devices 106-114 include electronic devices, such as, for example, a desktop computer 106, a mobile telephone or smartphone 108, a personal digital assistant (PDA) 110, a laptop computer 112, a tablet computer 114, a media player, a media streaming device, etc. However, any other or additional client devices could be used in the communication system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

As described in more detail below, client devices 108-114 may provide adaptive and efficient database protection and migration that incorporate device state changes of the client devices 112-114. Additionally, data written to read from the database may be data that is locally stored on the client devices 108-114, stored on the server 104, for example, in a cloud storage configuration, or a combination of both.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
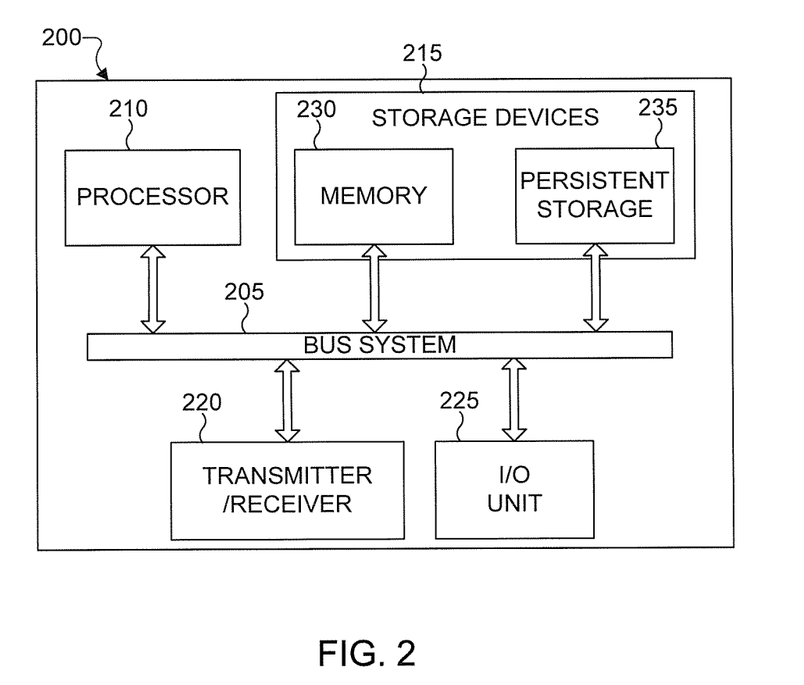
FIGS. 2 and 3 illustrate example electronic devices in a communication system according to this disclosure.
Figure 3:
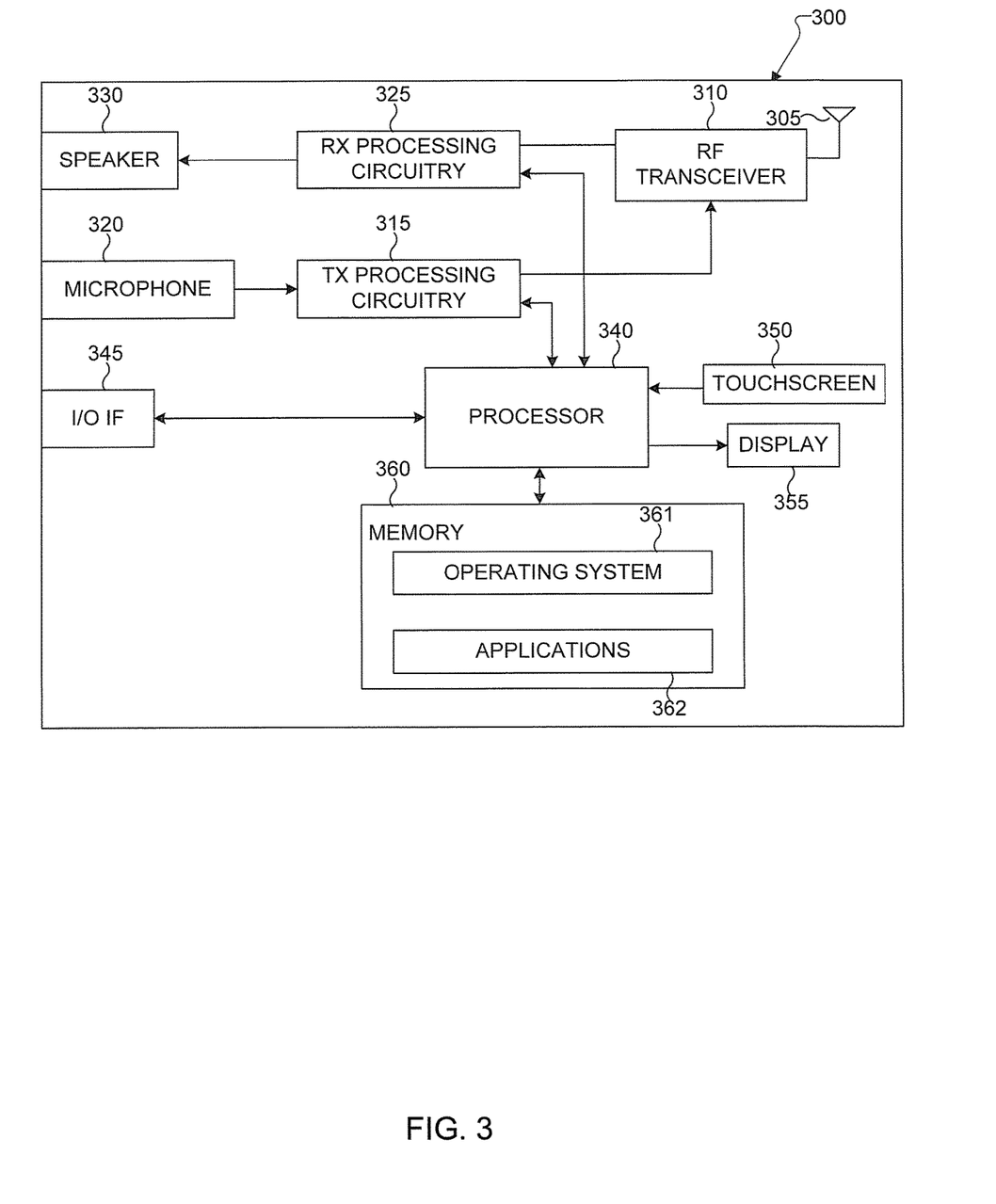

FIGS. 2 and 3 illustrate example electronic devices in a communication system according to this disclosure. In particular, FIG. 2 illustrates an example electronic device 200, and FIG. 3 illustrates an example electronic device 300. The electronic device 200 could represent the server 104 in FIG. 1, and the electronic device 300 could represent one or more of the client devices 106-114 in FIG. 1.

As shown in FIG. 2, the electronic device 200 includes a bus system 205, which supports communication between at least one processor 210, at least one storage device 215, at least one transmitter/receiver 220, and at least one input/output (I/O) unit 225.

The processor 210 executes instructions that may be loaded into a memory 230. The processor 210 may include any suitable number(s) and type(s) of processors or other devices in any suitable arrangement. Example types of processor 210 include microprocessors, microcontrollers, digital signal processors, field programmable gate arrays, application specific integrated circuits, and discreet circuitry. The processor 210 may be a general-purpose CPU or specific purpose processor for encoding or decoding of video data.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a read-only memory, hard drive, Flash memory, or optical disc.

The transmitter/receiver 220 supports communications with other systems or devices. For example, the transmitter/receiver 220 could include a network interface card or a wireless transceiver facilitating communications over the network 102. The transmitter/receiver 220 may support communications through any suitable physical or wireless communication link(s). The transmitter/receiver 220 may include only one or both of a transmitter and receiver, for example, only a receiver may be included in a decoder or only a transmitter may be included in an encoder.

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

As described in more detail below, the electronic device 200 may provide adaptive and efficient database protection and migration that incorporates device state changes. For example, the electronic device 200 may be a device that a user securely accesses or enters data to or from. In another example, the electronic device 200 may be a server, for example, in a cloud storage configuration, that stores at least part of a database that that utilizes the adaptive and efficient database protection and migration incorporating device state changes provided by embodiments of the present disclosure.

FIG. 3 illustrates an example electronic device 200 according to this disclosure. The embodiment of the electronic device 200 illustrated in FIG. 3 is for illustration only, and the client devices 106-114 of FIG. 1 could have the same or similar configuration. However, electronic devices come in a wide variety of configurations, and FIG. 3B does not limit the scope of this disclosure to any particular implementation of an electronic device.

As shown in FIG. 3, the electronic device 200 includes an antenna 305, a radio frequency (RF) transceiver 310, TX processing circuitry 315, a microphone 320, and receive (RX) processing circuitry 325. The electronic device 200 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors and execute the basic OS program 361 stored in the memory 360 in order to control the overall operation of the electronic device 200. In some embodiments, the processor 340 includes at least one microprocessor or microcontroller.

The processor 340 is also capable of executing other processes and programs resident in the memory 360, such as operations that request or enter data as well as protection and migration applications for securely administering a database with device state changes. The processor 340 can move data into or out of the memory 360 as required by an executing process. In some embodiments, the processor 340 is configured to execute a plurality of applications 362, such as applications for providing adaptive and efficient database protection and migration that incorporates device state changes. For example, the electronic device 300 may be a device that a user securely accesses or enters data to or from.

The processor 340 can operate the plurality of applications 362 based on the OS program 361. The main processor 340 is also coupled to the I/O interface 345, which provides electronic device 200 with the ability to connect to other devices such as laptop computers and handheld computers. The I/O interface 345 is the communication path between these accessories and the main controller 340.

The processor 340 is also coupled to the touchscreen 350 and the display 355. The operator of the electronic device 200 can use the touchscreen 350 to enter data into the electronic device 200. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIGS. 2 and 3 illustrate examples of devices in a communication system, various changes may be made to FIGS. 2 and 3. For example, various components in FIGS. 2 and 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the electronic device 300 configured as a mobile telephone or smartphone, electronic devices could be configured to operate as other types of mobile or stationary devices. In addition, as with computing and communication networks, client devices and servers can come in a wide variety of configurations, and FIGS. 2 and 3 do not limit this disclosure to any particular electronic devices.

Figure 4:
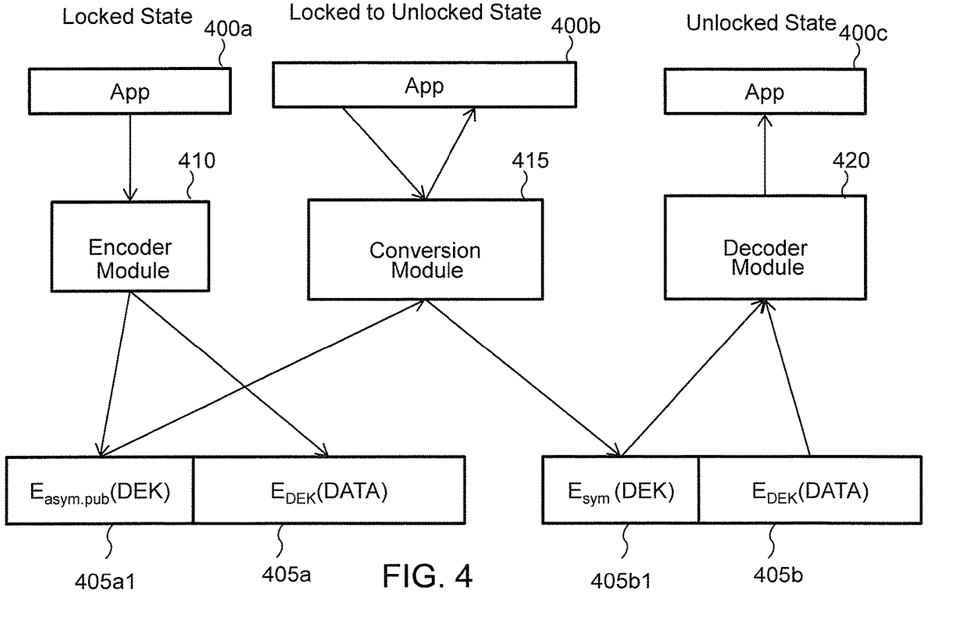
FIG. 4 illustrates a flow diagram for handling of sensitive data in different device states according to illustrative embodiments of this disclosure.
Figure 5:
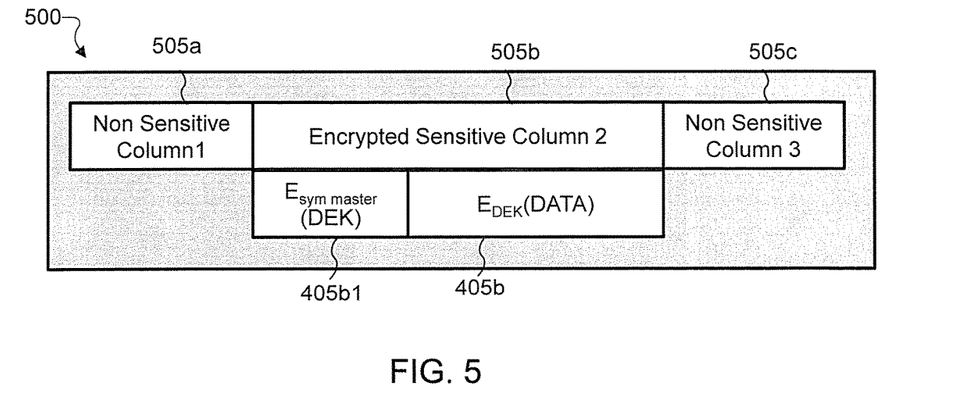
FIG. 5 illustrates a block diagram of columns in database with sensitive data encrypted using symmetric encryption according to illustrative embodiments of this disclosure.

FIG. 4 illustrates a flow diagram for handling of sensitive data in different device states according to illustrative embodiments of this disclosure and FIG. 5 illustrates a block diagram of columns 505 in database 500 with sensitive data being encrypted using symmetric encryption according to illustrative embodiments of this disclosure. In these illustrative embodiments, the electronic device 200 and/or 300 manages sensitive data according to different device states.

In various embodiments of the present disclosure, sensitive data or columns (e.g., column 505b) that contain sensitive data in the database 500 are protected based on the device states using two master keys, namely a symmetric master key and an asymmetric master key. For example, these keys may be derived from the device password, meaning these keys may or should only be available in an unlocked state.

In general, in these embodiments, the sensitive data is protected as being encrypted using a symmetric key called data encryption key (DEK) as denoted in the database cells 405a and 405b by $E_{DEK}(DATA)$. This DEK is encrypted directly or indirectly using one of the master keys (e.g., as denoted by $E_{asym.pub}(DEK)$ or $E_{sym}(DATA)$ in the headers 405a1 and 405b1 for the sensitive data cells 405a and 405b), depending on device state, as will be discussed in greater detail below.

In these embodiments, for data entered using an application 400a during a locked state for a write (or update) operation, the encoder module 410 uses the asymmetric master public key to protect the entered sensitive data. For example, the encoder module 410 encrypts the sensitive data entered via application 400a using the DEK and stores the encrypted sensitive data in cell 405a in sensitive column 505b in database 500. The encoder module 410 also encrypts the DEK used to encrypt the sensitive data using the asymmetric master public key and stores the encrypted DEK in header 405a1 of cell 405a in sensitive column 505b in database 500. The asymmetric master private key of the asymmetric master key pair is used in the unlocked state by the conversion module 415 and/or the decoder module 420 for reading the data encrypted using asymmetric public key. For example, as discussed in greater detail below, the conversion module 415 may convert the asymmetric encryption of the sensitive data in cell 405a into symmetrically encrypted data in cell 405b using the asymmetric master private key. In another example, if not previously converted, the conversion module 415 may decrypt the asymmetrically encrypted data in cell 405a by decrypting the DEK using the asymmetric master private key and decrypting the data using the decrypted DEK and provide the decrypted data to an application 400b requesting the data, for example, during the conversion process or shortly after transition from the locked to unlocked states.

In these embodiments, for data read or written using an application 400c during the unlocked state, the symmetric master key is used both writing and reading operations as the symmetric master key is available in the unlocked state due to availability of the password. For example, as illustrated, the decoder module 420 may decrypt the symmetrically encrypted data in cell 405b by decrypting the DEK using the symmetric master private and decrypting the data using the decrypted DEK and provide the decrypted data to the application 400c. Similarly, data entered or updated during the unlocked stated may be protected, for example, by the encoder module encrypting the sensitive data entered using the DEK and storing the encrypted sensitive data in cell 405b in sensitive column 505b in database 500 and also encrypting the DEK used to encrypt the sensitive data using the symmetric master key and storing the encrypted DEK in header 405b1 of cell 405b in sensitive column 505b in database 500

Protecting sensitive data using keys (e.g., the symmetric master key and the asymmetric master public key) that are derived from the password for the device, restricts or reduces the possibility that these keys can derived in when the device is in the locked state. The above described techniques enable sensitive data to be read only in unlocked state but to be written both in unlocked and locked states. In these embodiments, all data queries (e.g., structured query language (SQL) statements/operations) are available in the unlocked state for the sensitive columns like any other non-sensitive columns. In locked state, the electronic device provides best effort support for data query handling even though the sensitive data is not readable with some adaptation and restrictions. Since the symmetric master key cannot be used in the locked as it is not safe since the password is not available, asymmetric encryption is used to enable addition of sensitive data in locked state.

In these embodiments, the applications 400 configure the sensitive columns in the database 500 and then works agnostic to the internals of the database 500. The applications do not participate in the protection of data. However, the applications can change the sensitivity of the columns (e.g., sensitive to non-sensitive and vice versa) for example based on user input or inclusion of predetermined sensitive content. These electronic device uses the state changes to decide whether sensitive data is accessible or not at any point of time. The locked state is a device state where the user has not logged-in or has logged out. The unlocked state is a device where the user has logged-in authenticating oneself to the device using the password. Database data are classified in to two types sensitive data and non-sensitive data. Data in sensitive columns are those columns that cannot be decrypted during locked state. For example, the encryption keys for decrypting the sensitive columns are only available the unlocked state. Sensitive columns are still allowed to be added in locked state using the asymmetric master public key. The DEK is derived may be derived from the symmetric master key and is used to encrypt and decrypt any new sensitive data in the cells for sensitive column 505b added in the unlocked state. In the locked state, the DEK is protected by the asymmetric public master key and used to encrypt any new sensitive data in the cells for sensitive column 505b added.

Embodiments of the present disclosure recognize that asymmetric decryption can be expensive in terms of time and resources as compared to symmetric decryption.

Accordingly, embodiments of the present disclosure provide a conversion module 415 to implement a conversion phase when the device becomes unlocked. In the conversion phase, the DEKs that were used to encrypt records that were added/updated during the locked state are translated from asymmetric protection to symmetric protection. This enables faster decryption when the application(s) 405 read the sensitive data in the unlocked state.

Figure 7:
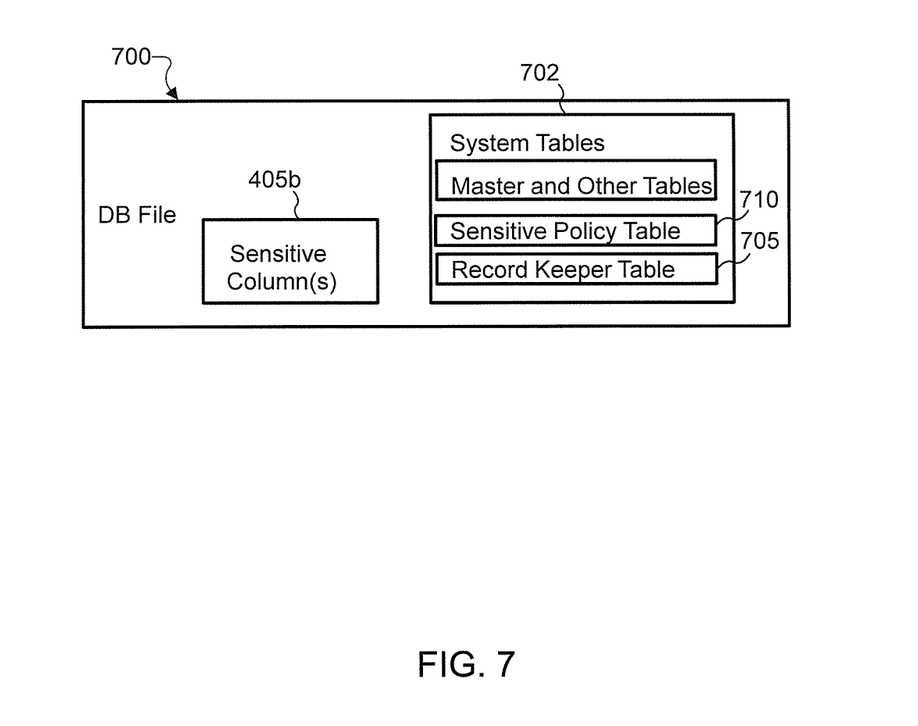
FIG. 7 illustrates a block diagram of a database file according to illustrative embodiments of this disclosure.

In this illustrative embodiment, the conversion module 415 converts the DEKs from asymmetric encrypted DEK (e.g., as denoted in header 405a1) to symmetric encrypted DEK (e.g., as denoted in header 405b1). The conversion module 415 records all the records that were inserted or updated during the locked state in a system table called, for example, record keeper table 705 as illustrated in FIG. 7, which illustrates a block diagram of a database file 700 according to illustrative embodiments of this disclosure. Upon or after the change of the device state to the unlocked state, the conversion module 415 starts to convert all these records that are marked in the record keeper table 705 from asymmetric encrypted data to symmetric encrypted data.

This conversion module 415 incorporates both efficiency and adaptability into this conversion process. For example, in various embodiments, the conversion module 415 may perform as few operations as possible to convert the encryption. For example, instead of decrypting and re-encrypting the sensitive data entered during the locked state, the conversion module 415 may rather just decrypt and re-encrypt the DEK used to encrypt the data thereby converting from asymmetrically encrypted data to symmetrically encrypted data without needing to re-encrypt the actual data. In another example, the conversion module 415 may only partially read each database cell 505. For example, instead of reading the entire database cell 505, the conversion module 415 may only read the database cell header to determine if the encryption of the data needs to be converted. For example, only database cell headers encrypted using the public master key may need to be decrypted an re-encrypted as discussed above. Thus, the conversion module 415 may only search for and read database cell headers to identify those encrypted using the public master key.

Additionally, in various embodiments, the conversion module 415 may convert as many of the records as possible when the device state is changes to the unlocked state until identification of a competition by an application 400 to interact with database 500. For example, application 400b may request to read or write to sensitive data in the database 500 during the conversion process. In this scenario, so as to not interrupt the application's 400b request, the conversion module 415 may relinquish a lock on requested database cells or columns. For unconverted records, the conversion module 415 may utilize asymmetric decryption to decrypt the unconverted and requested data and provide the decrypted data to the requesting application 400b. This adaptability enables the application 400b to access the database 500 without interruption and provide the application 400b with quicker access to requested records by avoiding, at least temporarily, the conversion process before protected data in the database 500 can be accessed by the application 400b.

The depiction of the database 500 and the flow diagram in FIGS. 4 and 5 are for the purposes of illustrating example embodiments of the present disclosure. Other configurations may be implemented or different components may be used in addition to or instead of the depicted components. For example, the sensitive data may be directly encrypted with the public master key during the locked state instead of the DEK. The functionally of the modules 410-420 may be implemented in software, hardware, or a combination of both. Additionally, while depicted as separate, the modules 410-420 may be combined or further subdivided in to any number of modules. Additionally, any number of sensitive or non-sensitive columns 505 may be present in the database 500

Figure 6:
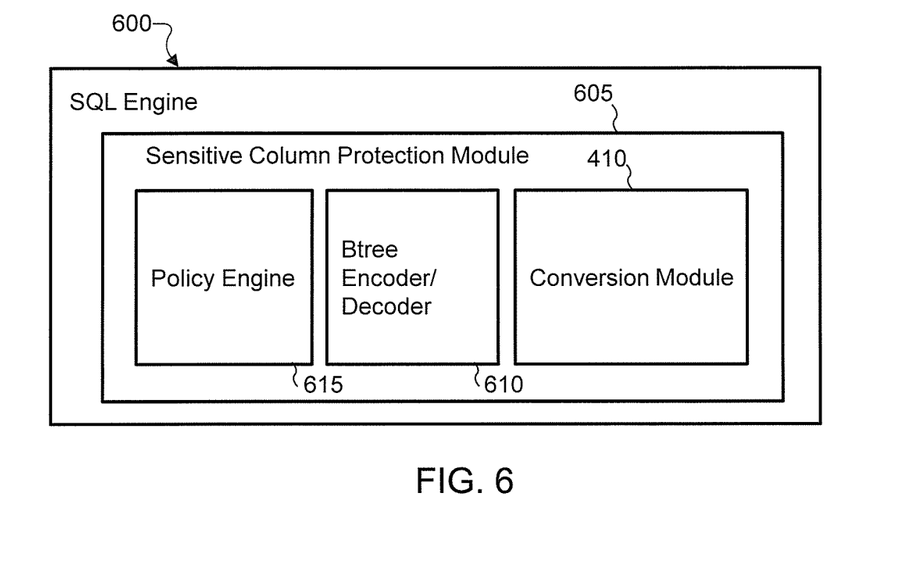
FIG. 6 illustrates a block diagram of a search engine according to illustrative embodiments of this disclosure.

FIG. 6 illustrates a block diagram of a search engine 600 according to illustrative embodiments of this disclosure. In this illustrative embodiment, the search engine 600 is an SQL engine 600 that may be implemented on the electronic device 200 and/or 300 to search database 500 for data. The illustration of search engine 600 is for example other types of search engines may be implemented in addition to or instead of the SQL engine 600.

Various embodiments of the present disclosure provide adaptive SQL support for operations in the locked state. In these embodiments, SQL engine 600 includes a sensitive column protection module 605 to manage security in searches depending on device state. For example, SQL statements that were functioning in the unlocked state continue to work in the locked state where the sensitive columns that cannot be decrypted are treated appropriately by sensitive column protection module 605 for operations to go forward without hindrances. As discussed above, sensitive and non-sensitive can co-exist in the same database both in locked and unlocked device states and sensitive data is not read in the locked state. However, in the locked state, sensitive column protection module 605 adapts update and read operations on the database record that is a mixture of sensitive and non-sensitive columns to this co-existence where some data can be read and other data cannot be read.

In these embodiments, the sensitive column protection module 605 includes a Btree sensitive data encoder/decoder 610 to adapt to the requirement or expectation for requested data without failing the SQL statements made by the application 400 with a 0 or 1 result. For read statements in locked state, the SQL engine 600 allows the application 400 to pre-configure the expected behavior ahead of time, for example, whether a read failure to a sensitive column or cell should be treated as exception, a raw database cell, or an empty blob. These configurations for the sensitive columns may be managed by the policy engine 615 and stored in the sensitive policy table 710 of the system tables 702 in the database file 700.

Also on update statements, SQL engine 600 treats read failures as a raw encrypted blob so that read operation does not fail and the write operation does not re-encrypt the read encrypted raw encrypted data for sensitive columns. This results in the update operation to be tolerant in locked state. For example, read failures of some of the sensitive columns of the database record that would otherwise occur in the locked state as the sensitive columns are not decryptable are allowed or tolerated during an update by the Btree sensitive data encoder/decoder 610 decoding the sensitive data as a raw encrypted blob and encoding back the entered and updated sensitive data without (or with) re-encrypting the already encrypted blob.

Figure 8:
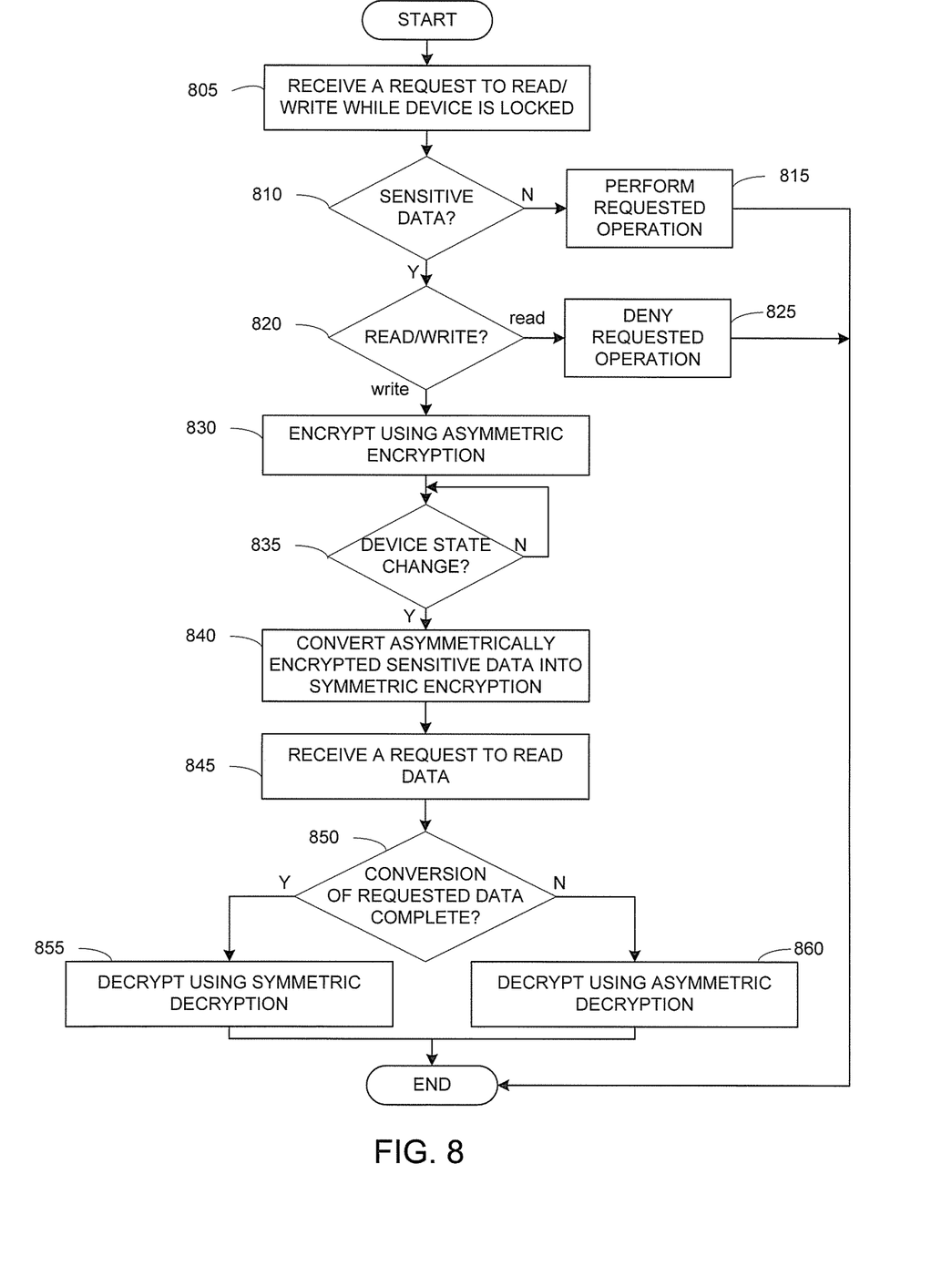
FIG. 8 illustrates a process for data security that incorporates device state in accordance with various embodiments of the present disclosure.

FIG. 8 illustrates a process for data security that incorporates device state in accordance with various embodiments of the present disclosure. For example, the process depicted in FIG. 8 may be performed by the electronic device 200 in FIG. 2 or the electronic device 300 in FIG. 3.

The process begins with the electronic device receiving a request to read or write data to or from the electronic device while in a locked state (step 805). For example, in step 805, the request may be from one of the applications 400.

Thereafter, the electronic device determines whether the request is for sensitive data (step 810). For example, in step 810, the electronic device may use the record keeper table 705 to determine which columns in the database 500 contain sensitive data. If for non-sensitive data, the electronic device performs the requested read/write operation (step 815). For example, in step 815, if a write operation, the electronic device may store non-sensitive data written using the application while the electronic device is in the locked state in cells in the database 500 without encryption.

If for sensitive data, the electronic device determines whether the requested operation is for reading or writing of sensitive data (step 820). If the requests is to read sensitive data while the electronic device is in the locked state, the electronic device denies the requested read operation (step 825). If the requests is to write sensitive data while the electronic device is in the locked state, the electronic device encrypts and stores the sensitive data using a public key of an asymmetric master key pair (step 830). For example, in step 830, the electronic device may encrypt the sensitive data using the DEK and encrypting the DEK using the asymmetric master public key where the private key of the asymmetric master key pair is derived based on a user password used to unlock the electronic device to enter the unlocked state.

If the electronic device enters an unlocked state (step 835), the electronic device converts asymmetric encryption of the sensitive data entered during the locked state into symmetric encryption of the sensitive data using a symmetric master key (step 840). For example, in step 840, the electronic device may decrypt the encrypted DEK using the private key of the asymmetric master key pair and re-encrypting the DEK using the symmetric master key without decrypting and re-encrypting the sensitive data. The electronic device may also identify which of the cells in the database to convert based on whether the header for the cell includes the DEK being encrypted with the public key. The symmetric master key may be derived based on a user password used to unlock the electronic device to enter the unlocked state.

If the electronic device receives a request for the sensitive data (step 845), the electronic device determines whether the conversion of the asymmetric encryption of the sensitive data to symmetric encryption is complete (step 850). If complete, the electronic device, decrypts the sensitive data using symmetric encryption (step 855) and provides the requesting application with access to the decrypted sensitive data.

If not complete, the electronic device, decrypts the sensitive data using asymmetric encryption (step 860). For example, in step 860, the electronic device may stop the conversion process to allow the application to access the database and providing the application access to the decrypted sensitive data.

Although FIG. 8 illustrates an example of a process for data security that incorporates device state various changes could be made to FIG. 8. For example, while shown as a series of steps, various steps in each figure could overlap, occur in parallel, occur in a different order, or occur multiple times.

Embodiments of the present disclosure enables management of sensitive data in databases based on device states. The security features provided in the embodiments of the present disclosure increase data security for applications and can provide for seamless co-existence of sensitive data added during locked state and unlocked state while reducing or eliminating glitches on the behavior in the locked state even though the encrypted data cannot be decrypted during locked state Embodiments of the present disclosure further provide enhanced database support that enables co-existence of sensitive and non-sensitive data without reducing the current capability but making sure the sensitive data is not read during locked state. Embodiments of the present disclosure further provide enhanced database support to enable seamless database operations even in locked state where the master encryption keys are not available to decrypt the sensitive data and thereby behaving similarly to as if database is operated without any sensitive data. Embodiments of the present disclosure further provide enhanced database support to enables support for efficient and adaptive conversion of keys from asymmetric to symmetric protection for sensitive data that was added or updated in a locked state.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for data security incorporating device state, the method comprising:
   encrypting sensitive data written to an electronic device while the electronic device is in a locked state using a public key of an asymmetric master key pair;
   adapting update operations of a search engine to enable read failures of sensitive columns of a database to be allowed during an update; and
   in response to detecting that the electronic device enters an unlocked state, converting asymmetric encryption of the sensitive data into symmetric encryption of the sensitive data using a symmetric master key without decrypting and re-encrypting the sensitive data,
     wherein the encrypted sensitive data and non-encrypted non-sensitive data are stored in different columns in a single database.

2. The method of claim 1, wherein encrypting the sensitive data written to the electronic device while the electronic device is in the locked state comprises encrypting the sensitive data using a data encryption key (DEK) and encrypting the DEK using the public key.

3. The method of claim 2, wherein converting the asymmetric encryption of the sensitive data into the symmetric encryption of the sensitive data comprises decrypting the encrypted DEK using a private key of the asymmetric master key pair and re-encrypting the DEK using the symmetric master key.

4. The method of claim 2, further comprising:
   storing the encrypted sensitive data in a cell in the database and the encrypted DEK in a header for the cell; and
   storing non-sensitive data written to the electronic device while the electronic device is in the locked state in cells in the single database without encryption.

5. The method of claim 4, wherein converting the asymmetric encryption of the sensitive data into the symmetric encryption of the sensitive data comprises identifying which cells in the single database to convert based on whether the header for the cell including the DEK being encrypted using the public key.

6. The method of claim 1, wherein converting the asymmetric encryption of the sensitive data into the symmetric encryption of the sensitive data comprises in response to receiving a request for the sensitive data from an application on the electronic device before the asymmetric encryption of the sensitive data has been converted into the symmetric encryption, decrypting the sensitive data using the asymmetric encryption and providing the application access to the decrypted sensitive data.

7. The method of claim 1, wherein a private key of the asymmetric master key pair and the symmetric master key are derived based on a user password used to unlock the electronic device to enter the unlocked state.

8. The method of claim 1, further comprising denying a request to access to the encrypted sensitive data while the electronic device is in the locked state.

9. An apparatus for an electronic device for data security incorporating device state, the apparatus comprising:
a memory; and
at least one processor, the at least one processor configured to execute program code stored in the memory to cause the apparatus to:
encrypt sensitive data written to an electronic device while the electronic device is in a locked state using a public key of an asymmetric master key pair;
adapt update operations of a search engine to enable read failures of sensitive columns of a database to be allowed during an update; and
convert, in response to detecting that the electronic device enters an unlocked state, asymmetric encryption of the sensitive data into symmetric encryption of the sensitive data using a symmetric master key without decrypting and re-encrypting the sensitive data,
wherein the encrypted sensitive data and non-encrypted non-sensitive data are stored in different columns in a single database.

10. The apparatus of claim 9, wherein to encrypt the sensitive data written to the electronic device while the electronic device is in the locked state, the at least one processor configured to execute the program code stored in the memory to cause the apparatus to encrypt the sensitive data using a data encryption key (DEK) and encrypt the DEK using the public key.

11. The apparatus of claim 10, wherein to convert the asymmetric encryption of the sensitive data into the symmetric encryption of the sensitive data, the at least one processor configured to execute the program code stored in the memory to cause the apparatus to decrypt the encrypted DEK using a private key of the asymmetric master key pair and re-encrypt the DEK using the symmetric master key.

12. The apparatus of claim 10, wherein the at least one processor is further configured to execute the program code stored in the memory to cause the apparatus to:
store, using the memory, the encrypted sensitive data in a cell in the single database and the encrypted DEK in a header for the cell; and
store, using the memory, the non-sensitive data written to the electronic device while the electronic device is in the locked state in cells in the single database without encryption.

13. The apparatus of claim 12, wherein to convert the asymmetric encryption of the sensitive data into the symmetric encryption of the sensitive data, the at least one processor configured to execute the program code stored in the memory to cause the apparatus to identify which cells in the single database to convert based on whether the header for the cell including the DEK being encrypted using the public key.

14. The apparatus of claim 9, wherein to convert the asymmetric encryption of the sensitive data into the symmetric encryption of the sensitive data, the at least one processor configured to execute the program code stored in the memory to cause the apparatus to decrypt, in response to receipt of a request for the sensitive data from an application on the electronic device before the asymmetric encryption of the sensitive data has been converted into the symmetric encryption, the sensitive data using the asymmetric encryption and provide the application access to the decrypted sensitive data.

15. A non-transitory computer-readable medium comprising program code that, when executed by at least one processor of an apparatus for an electronic device, causes the apparatus to:
encrypt sensitive data written to an electronic device while the electronic device is in a locked state using a public key of an asymmetric master key pair;
adapt update operations of a search engine to enable read failures of sensitive columns of a database to be allowed during an update; and
convert, in response to detecting that the electronic device enters an unlocked state, asymmetric encryption of the sensitive data into symmetric encryption of the sensitive data using a symmetric master key without decrypting and re-encrypting the sensitive data,
wherein the encrypted sensitive data and non-encrypted non-sensitive data are stored in different columns in a single database.

16. The non-transitory computer-readable medium of claim 15, wherein the program code that, when executed by the at least one processor, causes the apparatus to encrypt the sensitive data written to the electronic device while the electronic device is in the locked state, comprises program code that, when executed by the at least one processor, causes the apparatus to encrypt the sensitive data using a data encryption key (DEK) and encrypt the DEK using the public key.

17. The non-transitory computer-readable medium of claim 16, wherein the program code that, when executed by the at least one processor, causes the apparatus to convert the asymmetric encryption of the sensitive data into the symmetric encryption of the sensitive data, comprises program code that, when executed by the at least one processor, causes the apparatus to decrypt the encrypted DEK using a private key of the asymmetric master key pair and re-encrypt the DEK using the symmetric master key.

18. The non-transitory computer-readable medium of claim 16, further comprising program code that, when executed by the at least one processor, causes the apparatus to:
store the encrypted sensitive data in a cell in the single database and the encrypted DEK in a header for the cell; and
store the non-sensitive data written to the electronic device while the electronic device is in the locked state in cells in the single database without encryption.

19. The non-transitory computer-readable medium of claim 18, wherein the program code that, when executed by the at least one processor, causes the apparatus to convert the asymmetric encryption of the sensitive data into the symmetric encryption of the sensitive data, comprises program code that, when executed by the at least one processor, causes the apparatus to identify which cells in the single database to convert based on whether the header for the cell including the DEK being encrypted using the public key.

20. The non-transitory computer-readable medium of claim 15, wherein the program code that, when executed by the at least one processor, causes the apparatus to convert the asymmetric encryption of the sensitive data into the symmetric encryption of the sensitive data, comprises program code that, when executed by the at least one processor, causes the apparatus to decrypt, in response to receipt of a request for the sensitive data from an application on the electronic device before the asymmetric encryption of the sensitive data has been converted into the symmetric encryption, the sensitive data using the asymmetric encryption and provide the application access to the decrypted sensitive data.

* * * * *